United States Patent [19]

Plunkett

[11] Patent Number: 5,118,125
[45] Date of Patent: Jun. 2, 1992

[54] RETAINER DEVICE FOR QUICK-RELEASE HUB

[76] Inventor: Hugh V. Plunkett, 1201 Yale Pl., #1403, Minneapolis, Minn. 55403

[21] Appl. No.: 605,126

[22] Filed: Oct. 29, 1990

[51] Int. Cl.⁵ .............................................. B62K 25/02
[52] U.S. Cl. .................................... 280/279; 280/288; 301/105 B; 301/111
[58] Field of Search ............... 280/274, 276, 277, 279, 280/280, 281.1, 285, 286, 288; 70/204, 210, 225, 233; 301/105 B, 111; 403/315, 321

[56]  References Cited
U.S. PATENT DOCUMENTS

| 3,894,751 | 7/1975 | Fuhrman et al. | 280/279 |
| 4,103,922 | 8/1978 | Brilando | 280/279 |
| 4,724,692 | 2/1988 | Turin et al. | 70/204 X |
| 4,805,941 | 2/1989 | Downing et al. | 280/288 X |
| 4,951,487 | 8/1990 | Dennis | 280/304.3 X |

Primary Examiner—Mitchell J. Hill

[57]  ABSTRACT

A quick-release wheel and cam lever retainer device to prevent accidental separation of wheel from bicycle fork consisting of a quick-release cam lever having an opening in the upper end adjacent to an opening in the lower end of a bicycle fork for cooperatively receiving a means for retaining the cam lever to the fork.

5 Claims, 2 Drawing Sheets

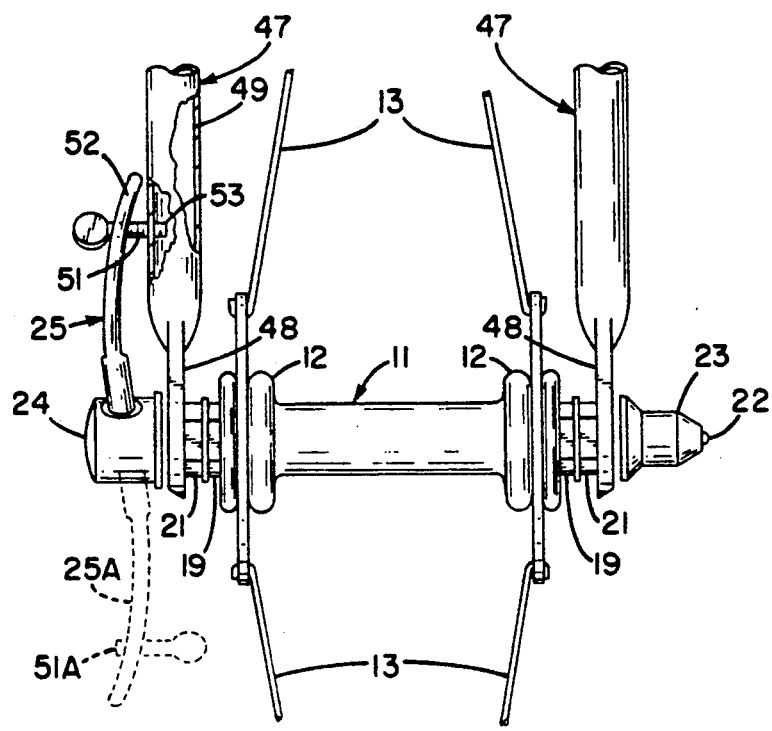
FIG. 1
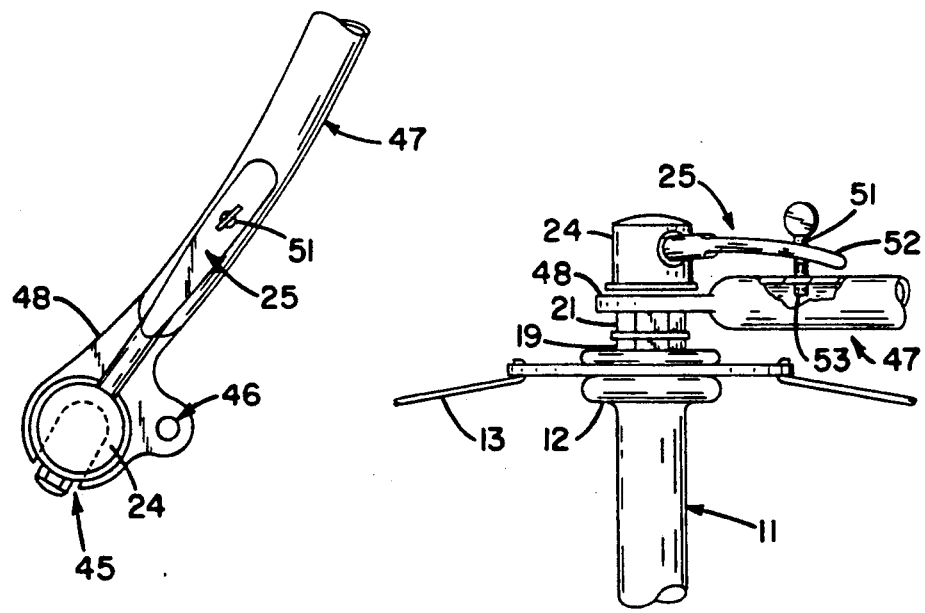
FIG. 2
FIG. 3

RETAINER DEVICE FOR QUICK-RELEASE HUB

BACKGROUND OF THE INVENTION

1. Field of the Invention

This invention relates generally to bicycles and more particularly to the mounting of front and rear wheel quick-release hubs.

2. Description of the Prior Art

Wheel, hub and axle assembly are customarily mounted in open-ended slots in the lower ends of the fork of a bicycle, with the axle being held in the slots by threadedly mounted retaining nuts on the outer ends of the axle and lock washers. Quick-release means have been incorporated therein providing adjustable retainer members movable relative to the axle longitudinally for retaining the axle in the fork slots by clamping means. Because accidents have occurred when quick-release hubs have been improperly fastened or tampered with or the cam lever has been moved from a closed to an open position by external forces causing such retaining nuts or members to loosen allowing the front wheel to separate from the fork, attempts have been made to provide additional retainer means for preventing such accidental separation. All known attempts have proven to be economically impractical to incorporate in the vast number quick-release hub and front fork assembly that exist. For example, U.S. Pat. No. 3,807,761 was described by the inventor in U.S. Pat. No. 4,103,922 as being too commercially impractical and expensive to incorporate in a quick-release hub. Further, all known attempts have lacked universal application because they require extensive coordination between or modification of the quick-release hub and axle relative to the front fork due to the fact that there are hundreds of different shapes and designs of bicycle front forks. Further, all known attempts have addressed the problem of separation of the hub from the fork or the accidental opening of the cam lever of the hub as independent problems, but have not addressed both problems in a single design. For example, U.S. Pat. No. 4,103,922 provides a method for preventing a quick-release hub from separating from a bicycle front fork, but does not appear to be applicable to rear quick-release hub separation and does not prevent the accidental opening of the cam lever.

SUMMARY OF THE INVENTION

The present invention provides a solution to both the problem of separation of the hub from the fork and accidental opening of the quick-release cam lever in a manner which is more economical and commercially feasible than the devices of the prior art and comprises a single retainer device mounted through a hole in the upper end of the cam lever of a quick-release hub and retainer means formed integrally in the adjacent fork leg for interengagement with said retainer device which positively prevents the cam lever from accidentally opening and positively prevents accidental separation of the hub from the fork even though the adjustable retainer members of the quick-release hub accidentally become loose with the cam lever in a closed or open position. To this end, the retainer device is resistantly passed through the upper end of the cam lever and so that the retainer device may be intentionally separated from the adjacent fork leg receiving means to enable easy removal of the hub from the fork when desired.

The invention may be incorporated into existing quick release hubs with only the modification of present commercial hub and fork assembly being the addition of a resistant hole in the cam lever and adjacent fork leg for the interengagement of the retainer device.

BRIEF DESCRIPTION OF THE DRAWINGS

FIGS. 1 is a front elevational view, with parts broken away, of a quick-release hub mounted in the lower end of a bicycle front fork and incorporating a preferred embodiment of the instant retainer device mounting.

FIG. 2 is a vertical view of the side of the hub and front fork of FIG. 1.

FIG. 3 is a horizontal view of the side of the hub and front fork of FIG. 1.

DESCRIPTION OF THE PREFERRED EMBODIMENT

Figure 6:
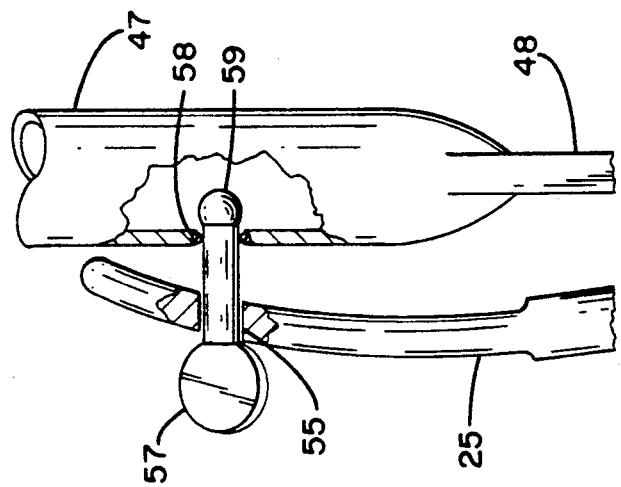
FIG. 6 is a cross section view of the interengagement portion of FIG. 1, increased 120%, showing a retainer means consisting of a bolt that is smooth with a shouldered end and receiving means that are smooth in the cam lever and resistant in the adjacent front fork.

The present invention is shown in the drawings as comprising a retainer bolt mounting for quick-release front hubs. As will be understood by one schooled in the art, the retainer bolt mounting for the rear quick-release hub and fork assembly would have identical application. This quick-release hub is designated generally by reference numeral 11 and includes a shell with end cups 12 and supporting and having attached thereto the usual wheel spokes 13 and a hollow axle (not shown) with outwardly threaded end portions, each with an axially extending keyway. The end cups 12 are rotably supported on the axle and being adjacent each end of the latter in well known manner and retained thereon by lock washers 19 (FIG. 1) and locking or retaining nuts 21. As is also well understood in the art, a quick-release unit is incorporated in the hub 11 in the form of a mounting stud or rod 22 extending axially through the hollow axle and having adjustable retainer members on its ends comprising a nut 23 (FIG. 1) and a excentric 24 movable relative to the stud 22 longitudinally thereof by a manually operable cam lever 25.

The drawings illustrate only the lower portions of a pair of legs 47 of the front fork of a bicycle, each having a lower end piece 48 mounted therein and depending therefrom in well known manner. As will be understood by one skilled in the art, these legs may be forged or turbular (as shown herein) and the end pieces 48 are each provided with the usual axle-receiving open-ended slot 45 (FIG. 2). The end pieces 48 can be provided with an eyelet 46 (FIG. 2). As will be understood by one skilled in the art, the eyelet 46 can be used to retain a variety of bicycle accessories and can be positioned in various locations on the end pieces 48 or on the legs 47 of the front fork. The end piece 48 or the leg 47 of the front fork can have more than one eyelet 46 or no eyelet at all. The position of the eyelet 46 can preclude or determine the use of prior art inventions which are dependent on the eyelet 46 for deployment. For example, U.S. Pat. No. 624,442 provides a means of retention that could not be used if eyelets were positioned so as to interfere with the projecting flange which embraces the end of the fork.

The axle of the quick-release hub 11 is illustrated as being seated in the upper ends of these slots 45 with the fork end pieces 48 disposed between the lock nuts 21 and their associated adjustable retainer members 23, 24. As also is well-known, following upward movement of the wheel and its hub 11 to so engage the axle in the slots 45 actuation of the manually operable cam lever 25 will draw the two retaining members 23, 24 together or toward each other to clampingly engage against the outer surfaces of the respective fork end pieces 48.

The present invention provides quick-release hub retaining means, the preferred embodiment of FIGS. 1–4 comprising a threaded bolt member indicated generally by reference numeral 51 mounted through the upper end of the cam lever 25 of the quick-release hub 11 by a receiving means formed integrally by a threaded hole or opening 52 and a receiving means formed integrally by a threaded hole 53 for cooperatively receiving said retainer means and disposed on the laterally outer portion of the adjacent said lower end of said front fork leg 47 for interengagement of the cam lever 25 and the fork leg 47 to prevent accidental opening of the cam lever 25a or separation of said hub 11 from said fork 47 despite release of said adjustable retainer members even if the cam lever 25 were in a closed position.

As can be seen by reference to the outline of the cam lever 25a and retainer bolt 51a in FIG. 1 with the cam lever 25a in the open position the retainer bolt 51a remains securely in the threaded receiving hole 52a of the cam lever 25a so as to avoid contact with the spokes 13 of the wheel assembly thereby avoiding interference with easy removal of said hub 11 and wheel assembly from the end pieces 48 when removal is intended by the bicycle operator. This is accomplished under the present invention by specifying that the threaded portion of the retainer bolt 51 shall not exceed a length measured by the distance between the laterally outer portion of the cam lever 25 in the closed position and the interior wall 49 of the adjacent front fork leg 47 directly opposite of the threaded hole 53 disposed on the laterally outer portion of said adjacent front fork leg 47. It will also be seen that the present invention provides a means for holding the retainer bolt 51 in the cam lever 25 even when the cam lever is in the open position 25a, 51a so that the retainer bolt 51, 51a will be in position for said interengagement and will not become separated from the hub 11 assembly when the wheel is removed from the end pieces 48.

Figure 5:
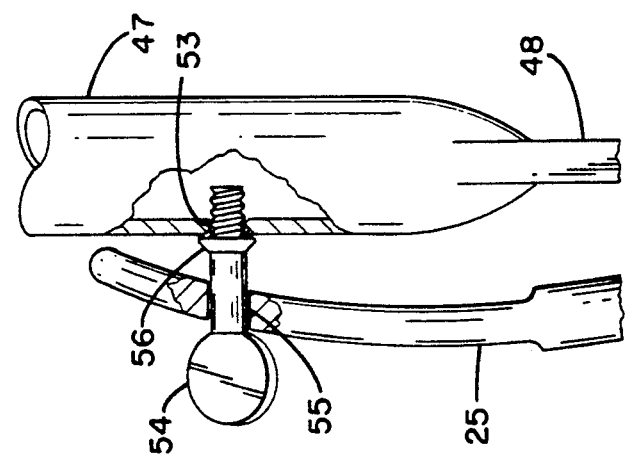
FIG. 5 is a cross section view of the interengagement portion of FIG. 1, increased 120%, showing a retainer means consisting of a bolt that is half smooth and half threaded and receiving means that are smooth in the cam lever and threaded in the adjacent front fork.
Figure 4:
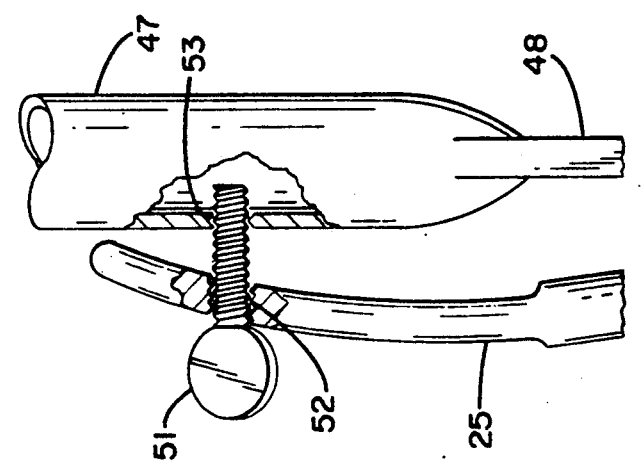
FIG. 4 is a cross section view of the interengagement portion of FIG. 1, increased 120%, showing a retainer means consisting of a threaded bolt and threaded receiving means.

It will also be observed that the present invention contemplates other retainer means similar to, but different from, the threaded retainer bolt. FIG. 5 shows a retainer means that would include a bolt or pin 54 that is smooth on the area within the receiving hole 55 of the cam lever 25 and threaded at the end which engages the receiving hole 53 of the adjacent fork leg 47. FIG. 6 shows a retainer means that would include a smooth retainer bolt or pin 57 with an enlarged end 59 opposite the bolt head for positive engagement in a resistant rubber opening 58 in the adjacent fork leg 47.

The embodiments of the invention in which an exclusive property or privilege is claimed are defined as follows:

1. A retainer device for a bicycle quick-release hub having an axle engageable in open-ended slots in lower ends of legs of a fork of the bicycle for receiving said axle, said quick-release hub including adjustable retainer members movable relative to said axle longitudinally thereof for clampingly retaining said axle in said slots, comprising a quick-release cam lever having an upper end with a first opening, means for retaining an upper end of said quick-release cam lever adjacent to said lower end of said fork leg, and means in the lower end of said fork leg for receiving said retaining means, said receiving means including a second opening for cooperatively receiving said retaining means.

2. A retainer device according to claim 1, wherein said retaining means is movable longitudinally relative to said axle.

3. A retainer device according to claim 1, wherein said retaining means comprises a threaded bolt and said first and second opening have threads therein for receiving said bolt.

4. A retainer device according to claim 1, wherein said retaining means comprises a bolt that is smooth on the upper half and threaded on the lower half with a shoulder separating the smooth half from the threaded half and said first opening is smooth in said cam lever and said second opening is threaded in said adjacent fork leg.

5. A retainer device according to claim 1, wherein said retaining means comprises a smooth bolt having a raised shoulder at an end thereof and said first opening being smooth in said cam lever and said receiving means including means mounted in said second opening for resistively restraining said shoulder of said bolt.

* * * * *